United States Patent [19]

Stipcevich

[11] 3,887,821

[45] June 3, 1975

[54] POWER TRANSMISSION SUBSTATION ARRANGEMENT

[76] Inventor: John M. Stipcevich, 114 Hampton Rd., Collingswood, N.J. 08108

[22] Filed: May 20, 1974

[21] Appl. No.: 471,597

[52] U.S. Cl. ............... 307/112; 317/103; 307/147; 307/85
[51] Int. Cl. ............................. H02b 1/20
[58] Field of Search ........... 317/103; 307/112, 147, 307/85, 86, 87, 113

[56] References Cited
UNITED STATES PATENTS 3,290,510  12/1966  Rose ............................. 307/147 X
3,302,069  1/1967  Wilcox .......................... 317/103 X Primary Examiner—Herman Hohauser
Attorney, Agent, or Firm—Paul & Paul

[57] ABSTRACT

Two main buses, each having a plurality of conductive arms extending from a central conductive main bus, are connected to a plurality of incoming lines by a plurality of breakers-and-a-half. Any two lines may therefore be connected to one another by means of one or the other main buses. The main buses are arranged such that neither crosses over any portion of the other. Moreover, due to the interior arrangement of the main buses relative to the breakers, no line crosses over any portion of either of the main buses.

10 Claims, 9 Drawing Figures

POWER TRANSMISSION SUBSTATION ARRANGEMENT

BACKGROUND OF THE INVENTION

This invention relates to power transmission apparatus. More particularly, it pertains to electical apparatus for use at transmission sub-stations.

In view of the extremely high cost of circuit breakers for high voltage transmission systems, an arrangement known as the "breaker-and-a-half" was developed. That design, which functions to connect either of a pair of adjacent lines to either of two electrical main buses, utilizes three breakers to do so, instead of the four breakers which previously were required. One breaker is connected between the two lines, a second breaker connects one of the lines to one main bus and the third breaker connects the second line to the other main bus. The pair of adjacent lines connected by the shared breaker is referred to as an "element." As the buses are extended in length, any number of line conductor pairs may be connected in similar fashion, with a comparable number of three element circuit breakers connected in line between the two main buses. This configuration is designed "totally exterior," describing the location of buses relative to breakers.

While the breaker and a half design accomplished the requisite cost reduction, further functional deficiencies were created. Principally, the foregoing breaker-and-a-half sub-station arrangement is faulty insofar as it necessitates cross-overs between electrical line conductors and electrical main buses. In such a situation, a single broken conductor may cause a short between the main bus and the line, thereby disabling either the half or the entire sub-station. Moreover, the configuration necessities substantial expenditures for main bus and line conduction supporting structures, foundations, insulators, and associated hardware. Attempts at improvement which involve a partially interior situation (i.e., a crossing main bus-over-main bus, rather than lines-over-main buses) has somewhat reduced the fault problems by replacing a conductor with a rigid bus in cross over situations. Nonetheless, foreign materials might still short out the two crossed main buses and disable the entire sub-station. Moreover, the partially interior design involves at least as great expenditures in terms of land and equipment as did the totally exterior design.

Accordingly, it is an object of the present invention to provide a high power sub-station arrangement for utilization of breaker-and-a-half bus design which avoids both line-over-bus cross overs and main bus -over-main bus cross overs.

SUMMARY OF THE INVENTION

The present invention retains the advantageous aspects of breaker-and-a-half design but does not present the cross over and expense problems incurred in the prior art. In accordance with the principles of the present invention, two individual electrical main buses, separated by an axis therebetween, are each made up of a central conductive portion and conductive arms extending therefrom. Of course, as in the prior art, the number of arms utilized depends upon the number of conductors which are to be connected by means of breakers to the buses. The basic assumption relied upon is that line-over-line cross overs are permitted, whereas any cross overs of main buses, either by lines or by other main buses, are to be avoided. Thus, the main buses themselves may be arranged with the conductive arms extending radially in any direction, with conductor connected thereto by means of the breakers. In fact, depending upon the embodiment utilized, virtually complete freedom results relative to the orientation of the lines, so long as they do not impinge upon an area defined by the outer periphery of the other main bus. In this fashion, the individual main buses may be regarded completely interior to the breakers, rather than exterior to the connection as in the prior art.

In an illustrative embodiment, four line pairs are connected in a breaker and a half arrangement wherein the buses are configured as an "H", depending upon the desired orientation of the lines.

A primary feature of the present invention resides in its economic use of supporting structures, foundations, insulators, and associated hardware. Moreover, embodiments of the present invention generally require shorter conductors, secondary cables, and cable trenching, as well as requiring less land area, fencing, and grading than do the prior art configurations.

DETAILED DESCRIPTION

Figure 1:
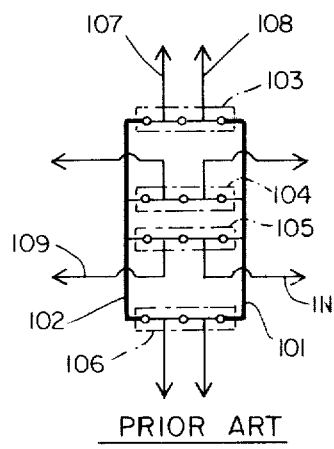
FIG. 1 shows a conventional fully exterior main bus breaker-and-a-half arrangement.

In FIG. 1, which illustrates the totally exterior prior art approach to breaker-and-a-half substation design, a pair of main buses 101 and 102 are situated parallel to one another. Arranged between the main buses are four circuit breaker elements 103 through 106. In particular, each breaker element includes three separate circuit breakers each symbolically shown as a circle. Each of the sets of breakers 103 through 106 is associated with a different pair of conductors, such as conductors 107 and 108. As may be seen, a given conductor such as 107 may be connected either to bus 101 or 102 by means of appropriate operation of the breaker element 103. Likewise, the other line pairs, such as lines 109 and 111 may be connected between main buses 101 and 102 by means of the three-breaker element 105. In this fashion an average of one and a half breakers per line is utilized to connect any given line to either of the two main buses.

The problems associated with the arrangement of FIG. 1 stem from the central location of breakers 104 and 105, (i.e. from the totally exterior nature of the configuration). If more than four line pairs were to be utilized other sets of three circuit breakers would be similarly arrayed between the end breaker systems 103 and 106. For each interior set of breakers, a line pair such as lines 109 and 111 of FIG. 1 is required to cross over the exterior buses 101 and 102. Clearly, if a line such as 109 or 111 falls and makes contact with its corresponding bus 101 or 102, the entire substation of FIG. 1 will be disabled. Likewise, although the apparatus of FIG. 1 is shown in symbolic form, it should not be forgotten that the amount of apparatus and land involved is extermely large.

Figure 2:
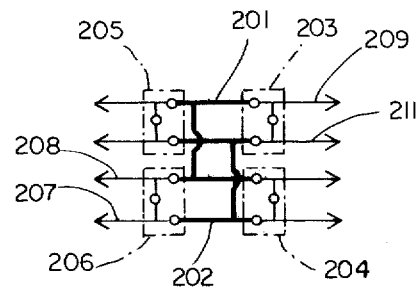
FIG. 2 shows a partially interior, partially exterior prior art arrangement with main bus-to-main bus crossovers.

The prior art arrangement of FIG. 2 represents an attempt to avoid the line-over-bus cross over problem which is demonstrated in the FIG. 1 apparatus. For the sake of comparison, all elements in FIG. 2 are numbered correspondingly to similar elements in FIG. 1, with a change of prefix from the 100 series to the 200 series. Hence, main buses 201 and 202 perform the same basic functions as did the main buses 101 and 102 in FIG. 1. Likewise, the four line pairs of FIG. 2 are connected to the respective buses by means of three element breaker combinations 203 through 206. The FIG. 2 configuration has been designated "partially interior" becuase, although the combination of buses 201 and 202 is interior to the breakers 203 through 206, each individually is not. In trade for the four line-over-bus cross overs of FIG. 1, the FIG. 2 configuration involves two crossovers of the buses 201 and 202. However, whereas lines 109 and 111 were forced to cross over the exterior buses, lines 209 and 211 are free to be run directly outwardly as are the other lines 207 and 208.

While in the normal course a bus frame is rigid, being made of aluminum conductor or the like, the arrangement of FIG. 2 still does not prevent electrical shorts between the two buses 201 and 202. For example, it is not at all unlikely that a passing bird could drop some electrically conductive material, such as wire, where bus 201 crosses over bus 202. In such a circumstance, the entire substation of FIG. 2 would be disabled. While the FIG. 2 apparatus is somewhat more compact than that of FIG. 1, it may be appreciated that the crossing over pattern utilized still involves substantial expenditures both as to land and as to material.

The breaker-and-a-half design connects a pair of adjacent lines to either of two main buses by employing only three breakers instead of the four breakers which would otherwise be required. One breaker is connected between the two lines, a second breaker connects one of the lines to one main bus and the third breaker connects the second line to the other main bus. The pair of adjacent lines connected by the shared breaker is referred to as an element.

Figure 3:
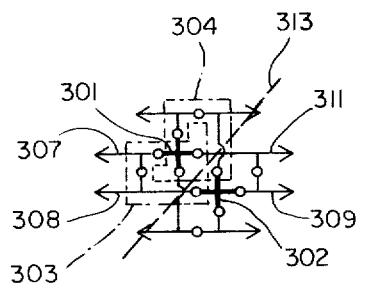
FIG. 3 shows an illustrative embodiment of the present invention for inter-main bus connection of four line pairs.

FIG. 3 shows an illustrative embodiment of the present invention for connection of four line pairs. Of course, the principles of the present invention are equally applicable to stations having three line pairs, or any number greater than four. In FIG. 3, the main buses 301 and 302 are totally physically disjoint from each other. In this respect, the FIG. 3 apparatus is somewhat similar to that of FIG. 1. It is clear, however, that the distinctive shape of the main buses 301 and 302 is much more economical of space then are the elongated buses 101 and 102 of FIG. 1. Likewise, the embodiment of FIG. 3 features line over line crossovers, rather than the main bus-over-main bus crossovers of FIG. 2 or the line over main bus cross overs of FIG. 1. Consequently, if a fault occurs at the point where two lines cross over one another, corresponding circuit breakers can isolate those lines from the main buses 301 and 302. In the event of such a fault, only the particular lines affected will be eliminated from service. The rest of the substation, including the main buses 301 and 302 and all remaining lines, continue in service as before.

For illustration, the breaker elements 303 and 304 in FIG. 3 to which each of the buses are connected are shown at the termination points of the buses. In fact, they are consolidated physically as are their counterparts in FIGS. 1 and 2, but are completely exterior to the buses 301 and 302.

The salient features of the embodiment of FIG. 3 are as follows. A dotted line 313 represents an axis between the two buses 301 and 302. This separation characteristic insures that no arm of either main bus will cross over any arm of the other. In addition, each of the main buses 301 and 302 is interior to all lines extending therefrom, with lines extending from the main buses 301 and 302 in such a manner as any crossover between a line and a main bus is prevented. Said otherwise, no line impinges an area defined by the periphery of the main buses. For example, both lines 307 and 308 and lines 309 and 311 go directly outward from the main buses without crossing the other main bus.

While the apparatus of FIG. 3 is the direct electrical counterpart of the substation of FIGS. 1 and 2, it nevertheless exhibits substantial physical and functional advantages over the prior art systems. First, any line-to-main bus or main bus-to-main bus electrical fault is prevented.

Moreover, the physical stature of the FIG. 3 apparatus is considerably less imposing than that of FIGS. 1 or 2. While symbolically, such as in FIG. 3, this distinction is not entirely evident, it must be remembered that the bus apparatus involves large stationary frames, whereas ariel conductors are considerably easier to deal with from a physical design point of view. Consequently, bus size remains the most prominent factor in terms of total space to be allocated to a substation. Clearly, the embodiment of FIG. 3 involves substantially less space for allocation to buses than either of the prior art systems of FIGS. 1 and 2.

Figure 4:
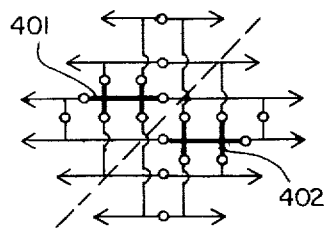
FIG. 4 shows an illustrative embodiment of the present invention for connection of 12 line pairs.
Figure 5:
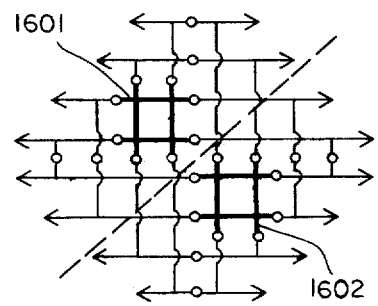
FIG. 5 shows an illustrative embodiment of the principles of the present invention for 16 line pairs.

FIGS. 4 and 5 respectively show embodiments of the present invention for switching of six and eight element pairs. As is apparent from those figures, substantial increase in the numbers of lines involved do little to increase the complexity or occupied space of the completely interior buses featuring the principles of the present invention. For example, buses 401 and 402 of FIG. 4 are of a modified H shape, with further horizontal arms extending therefrom. Buses 1601 and 1602 of FIG. 5 are of a basically square shape, with arms extending therefrom. An equally acceptable configuration for an eight element substation would involve the same basic shape as buses 401 and 402 of FIG. 4, but further would include two more vertical arms at the center portion of each bus. In either case, the sailent features of the present invention are retained. First, neither bus impinges a central dividing axis between the two. Also, neither arrangement allows for a conductor from one bus to impinge an area which circumscribes the other. Hence, the features and functions of the completely interior breaker-and-a-half voltage substation are retained.

Figure 6:
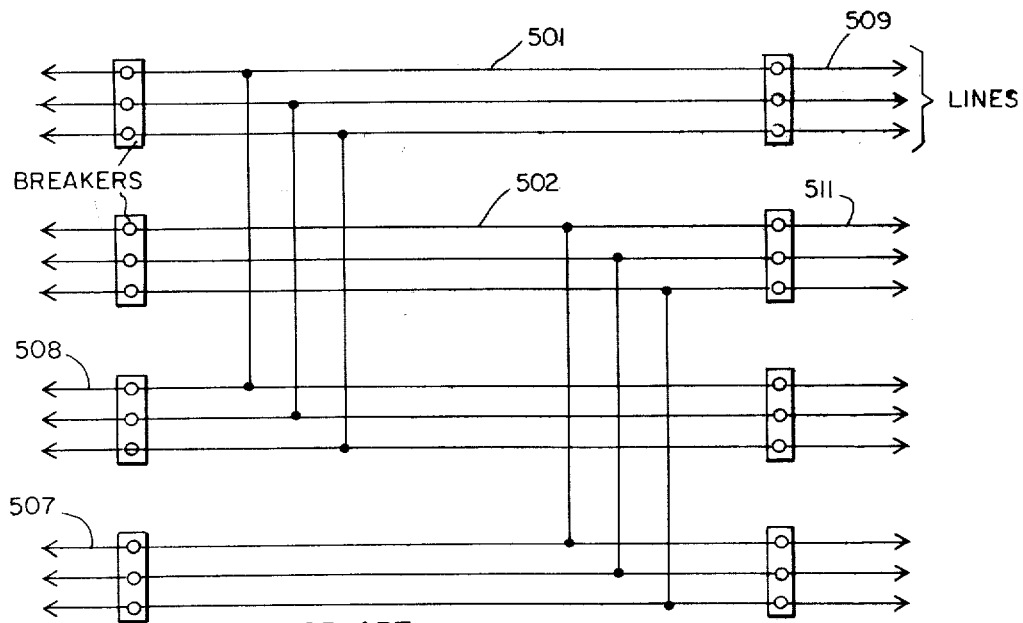
FIG. 6 shows a prior art three-phase arrangement.

As the switching substations become more and more complex, the advantages afforded according to the principles of the present invention become even more evident. This conclusion may be illustrated from consideration and comparison of FIGS. 6 and 7, which respectively represent three-phase versions for breaker-and-half substations of the types shown in FIGS. 2 and 3. In the FIG. 6 apparatus, six separate buses, each shaped like those of FIG. 2, are utilized. For example, bus 501 is analogous to main bus 201 of FIG. 2, and bus 502 is analogous to main bus 202 of FIG. 2. Likewise, line pairs 507 and 508, and 509 and 511 as shown in FIG. 6 correspond to similarly numbered lines in FIG. 2. Not shown are shared breakers which also are necessary. The tremendous complexity involved in the FIG. 6 apparatus is evident at first glance. For example, thirty bus-over-bus crossovers are utilized. Moreover, due to the electrical necessities of isolating one bus from another, the FIG. 6 apparatus requires considerable land and ancillary apparatus. For illustration, reference may be had to an article in the August, 1966 issue of *Power Engineering* at page 34 entitled "EHV Substation Has Many Design Innovations." In order to operate the station described therein, which is a 500 KV version of the one shown schematically in FIG. 6, a substantial portion of 77.4 acres in a plat about one-half mile long and one quarter mile wide was required, with one set of roadways needed for maintenance.

Figure 7:
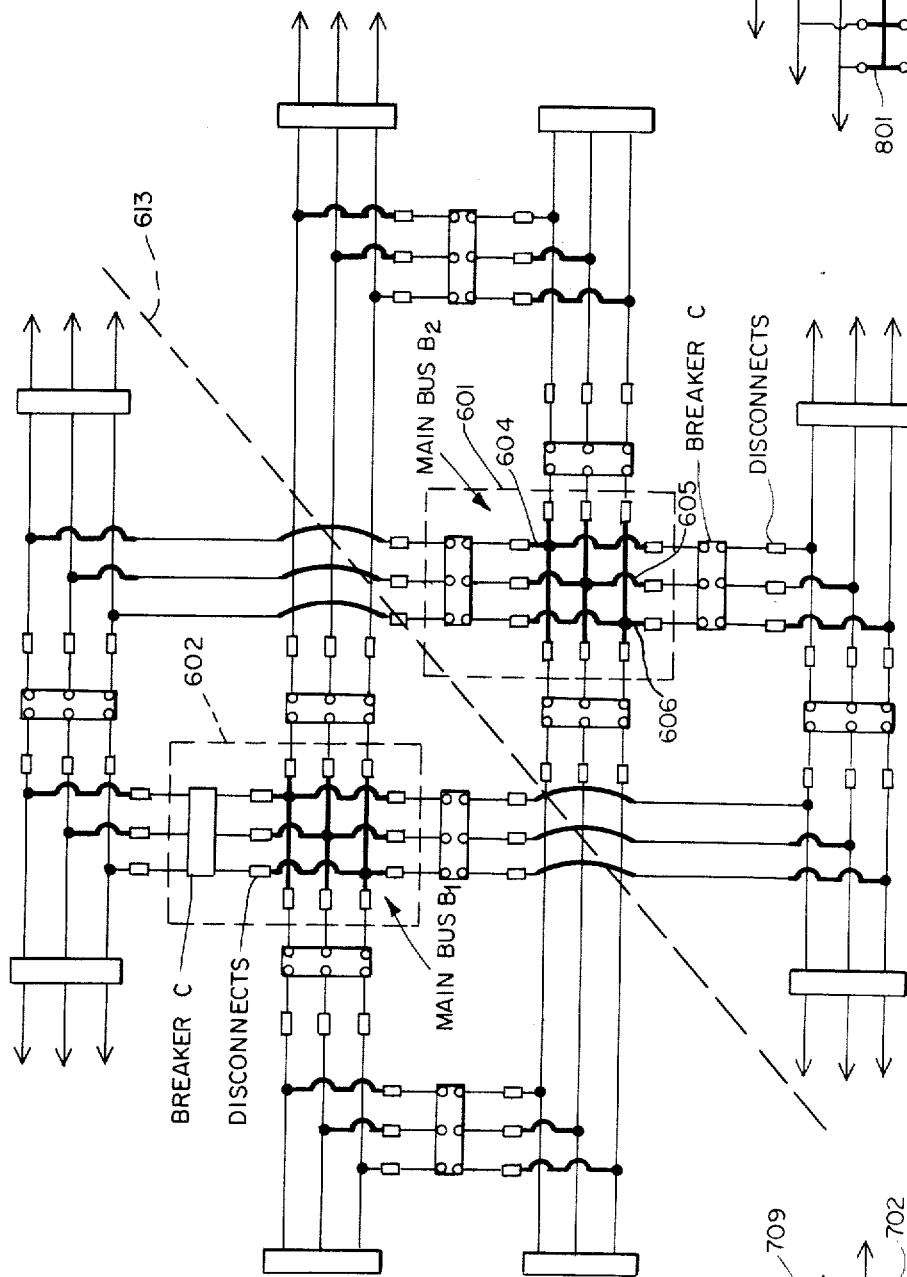
FIG. 7 shows a three-phase power substation utilizing the fully interior bus configuration of FIG. 3.

The apparatus shown in FIG. 7 represents the embodiment of FIG. 3 in terms of a three-phase power substation. In FIG. 7, all conductor crossings of the main bus cross segments of interconnections and of the line and over line crossings are accomplished by means of self-supporting hop over conductors described in U.S. Pat. No. 3364398 to J. M. Stipcevich. While the embodiment of FIG. 7 does involve limited numbers of bus-over-bus crossovers, it may be seen that those crossovers are different in nature from those of FIG. 6. That is, in FIG. 7, two main buses 601 and 602 are completely interior to all of the lines radiating outward therefrom. Within either of the two main buses 601 or 602, crossovers occur between phases. Nowhere, however, in the embodiment of FIG. 7 are there any crossovers between the respective buses in addition to crossovers of different phase buses from the same series of three phase conductors. In FIG. 7, for the sake of completeness, disconnect switches are provided for each bus and each crossover.

The physical significance of the incorporation of the principles shown in FIG. 7 to three phase power substations may be further appreciated by the following. For a 500 KV power substation, utilization of the embodiment of FIG. 7 results in savings over the prior art apparatus described above to the extent of approximately 5,000 feet of aluminum tubing for bus work and conductors, three and one half acres of land, one hundred expensive insulator structures and foundations therefor, and approximately 1,000 feet of trench work. In addition, the number of bus to bus crossovers entailed is substantially reduced.

A further feature of the embodiment of FIG. 7 relative to the prior art apparatus shown in FIG. 6 relates to the electrical properties thereof. In accordance with the FIG. 7 embodiment, any electrical short resulting from a stray electrical conductor brought on by a bird, or the like, will not disable the entire substation. For example, if such an obstruction causes a short between two of the different bus phases 604, 605, or 606 of the main bus 601, those particular phases would be eliminated from service. No other interruption of service would result, however. For example, the entire arrangement relating to second main bus 602, and all other lines connected thereto, is completely unaffected. Likewise, the remainder of the lines which are connected to main bus 601 would be unaffected by the electrical problems brought on by the shorted circuit. This is in marked contrast to the embodiment of FIG. 6, which would be disabled entirely if such a short circuit occured between corresponding main buses, such as buses 5001 and 502, of the different bus elements.

Another feature of the principles of the present invention involves the design flexibility which accrues from use thereof. It should be apparent from FIGS. 3–5 that in a fully interior bus construction, wherein all lines radiate outwardly from the main buses and from the breaker-and-a-half element, the lines in FIGS. 4 and 5 are in an east-west orientation, the same line may be drawn in a north-south orientation, or alternatively in mixtures of north-south and east-west orientation. The only restriction, of course, is that the lines are not drawn from one bus in such a manner as they impinge on the area circumscribing the other. In any event, this design freedom may only be obtained in the prior art with considerable difficulty and at the expense of inefficiency relative to land and equipment usage.

Figure 9:
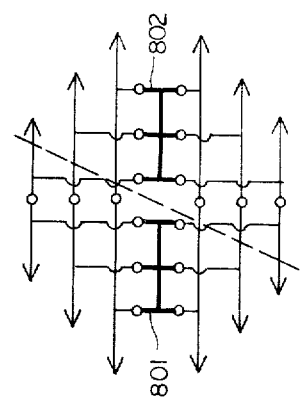
FIGS. 8 and 9 show alternative arrangements of the present invention which correspond to the embodiments of FIGS. 3 and 4, respectively.
Figure 8:
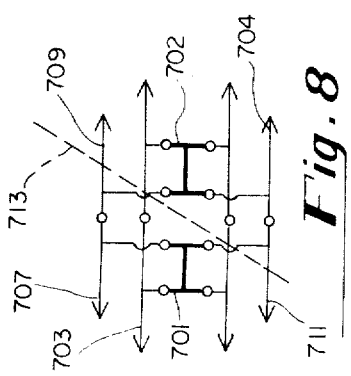

FIGS. 8 and 9 show alternative arrangements embodying the principles of the present invention. In particular, the embodiments of FIGS. 8 and 9 correspond respectively to the embodiments of FIGS. 3 and 4, but use different bus configurations. Hence, main busses 701 and 702 of FIG. 8 are analogous to main busses 301 and 302 of FIG. 3. The principal difference between the alternative configurations is in the orientation of the line conductors (such as 703 through 711 of FIG. 8 and 303 through 311 of FIG. 3) relative to one another. The same is true for the relationship between the embodiments of FIGS. 4 and 9.

The foregoing embodiments have been intended to be illustrative of the principles of the present invention, and in fact are inherently demonstrative of the manner in which they may be extended to serve apparatus of ever increasing complexity. It should be clear from the foregoing embodiments that many other alternatives may occur to those skilled in the art without departure from either the spirit or the scope of the principles of the present invention.

What is claimed is:

1. Electrical power substation apparatus comprising:
   a. first and second bus means separated by an axis therebetween, each bus means having a central conductive portion and appendages extending therefrom, each of said bus means being identified with a zone defined by said appendages;
   b. a plurality of circuit breaker means, each having three circuit breaker means, first and second ones of which are connected respectively to appendages of said first and second bus means; and
   c. a plurality of electrical lines, each being connected to a third breaker switch of one of said breaker means and to one other breaker switch of the same one of said breaker means, each of said lines being located exclusively of the zones identified with said first and second bus means.

2. A system as described in claim 1 wherein each of said bus means comprises a connecting node with said plurality of appendages extending radially from said connecting node.

3. A system as described in claim 2 wherein said plurality of appendages includes at least three elements.

4. A system as described in claim 1 wherein each of said bus means comprises a lateral conducting bar with said plurality of conductive appendages extending perpendicularly from said lateral bar.

5. A system as described in claim 1 wherein each of said bus means includes a square arrangement of conductive elements with said plurality of conductive appendages extending perpendicularly from the sides of said square arrangement.

6. Electrical power substation apparatus comprising:
  a. first and second bus means separated by an axis therebetween, each bus means including three bus phases, each bus phase having a central conductive portion and a plurality of appendages extending therefrom, each of said bus means being identified with a zone defined by appendages of its bus phases;
  b. a plurality of circuit breaker elements, each having three breaker means, first and second ones of which are connected respectively to corresponding appendages of said first and second bus means; and
  c. a plurality of three-phase electrical lines, each individual phase line being connected to a third breaker means of one of said breaker elements and to one other of the breaker means of the same of said one of said breaker elements, each of said electrical lines being located exclusively of the zones identified with said first and second bus means.

7. A system as described in claim 6 wherein each of said breaker phases includes a connecting node with said plurality of conductive appendages extending radially from said node.

8. A system as described in claim 7 wherein said plurality of appendages includes at least three appendages per bus phase.

9. A system as described in claim 6 wherein each of said bus phases comprises a lateral conducting bar with said plurality of appendages extending perpendicularly from said lateral bar.

10. A system as described in claim 6 wherein each of said bus phases includes a square arrangement of conductive elements with said plurality of appendages extending perpendicularly from the sides of said square arrangement.

* * * * *